United States Patent [19]
Gardner

[11] Patent Number: 5,738,445
[45] Date of Patent: Apr. 14, 1998

[54] JOURNAL BEARING HAVING VIBRATION DAMPING ELEMENTS

[75] Inventor: Willis W. Gardner, Waukesha, Wis.

[73] Assignee: Delaware Capital Formation, Inc., Waukesha, Wis.

[21] Appl. No.: 801,850

[22] Filed: Feb. 21, 1997

[51] Int. Cl.$^6$ ............................................. F16C 17/03
[52] U.S. Cl. ....................... 384/99; 384/119; 384/312
[58] Field of Search ............................. 384/99, 119, 117, 384/312, 311, 309

[56] References Cited

U.S. PATENT DOCUMENTS

| | | | |
|---|---|---|---|
| 4,743,125 | 5/1988 | Dammel et al. | 384/119 |
| 5,531,522 | 7/1996 | Ide et al. | 384/99 |
| 5,603,574 | 2/1997 | Ide et al. | 384/119 |

*Primary Examiner*—Lenard A. Footland
*Attorney, Agent, or Firm*—Ryan, Maki, Mann & Hohenfeldt

[57] ABSTRACT

A bearing structure for damping shaft vibrations wherein a fixed support member has an axially extending opening defined by a circular surface having a predetermined radius of curvature. A shaft extends centrally through the opening to provide an annular space between the periphery of the shaft and said circular surface. A plurality of bearing elements are circumferentially spaced apart around the shaft. A curved spring beam is interposed between each of the bearing elements and said circular surface defining the opening. The radially outwardly presented side of each spring beam has a radius of curvature greater than that of the circular surface so with the beam in direct contact with the circular surface a crescent shaped oil containment cavity is formed. A small oil inlet hole through the support member at each crescent shaped cavity supplies oil to the cavity. The oil acts to dampen shaft vibrations as it is pressurized in response to deflection of the spring beam reducing the volume in the cavity.

3 Claims, 1 Drawing Sheet

JOURNAL BEARING HAVING VIBRATION DAMPING ELEMENTS

BACKGROUND OF THE INVENTION

The invention disclosed herein pertains to journal bearings in general and in particular to bearings that have an improved capability for damping vibrations of a journal shaft that result from unbalance of the load that is mounted to the shaft and from unbalance of the shaft itself.

It is common knowledge that shafts and the loads on them are unlikely to be perfectly balanced despite holding close manufacturing tolerances and using precision balancing methods. Unbalance in the shaft or the load results in shaft deflection in all radial angles, in which case the shaft periphery will trace an ellipse of revolution at various vibrational frequencies depending on the rotational speed of the shaft. If the rotational speed is near to the natural frequency of shaft vibration, resonance can occur in which case shaft deflection due to load unbalance may continue to increase until possibly some part of a machine may become overstressed, resulting in its fracture and damage to the bearings.

Damping the vibrations that result from shaft and load unbalance is important for extending machine life, especially when rotor rotational speeds are high as in many turbomachines, for example. In pre-existing bearings, spring damping means in one form or another are often interposed somewhere between the bearing elements and the bearing shell, which surrounds the bearing elements, for centering the shaft in the shell. In such cases, the radially outwardly presented surfaces of the bearing elements have a small clearance between them and the inner surface of a cylindrical bearing shell. In these designs, lubricant is usually captured in some available space between the bearings and the shell so that deflection of the shaft due to unbalance creates pressure in the captured lubricating oil. Some of the oil is allowed to discharge through a restricted opening but the pressure in the oil is maintained to the extent that it opposes vibratory motion of the shaft and thereby buffers the vibrations. In some previous designs, the bearing pads were made of a resilient material, such as an aluminum alloy, that in itself served as the spring member which defined a thin cavity between its outer surface and the inner surface of the bearing shell. A disadvantage of this design is that the bearing pads are required to perform two functions, that is, flex to provide the spring and damping actions, and also provide a bearing surface to hydrodynamically support the shaft. Optimal design for both functions is not achieved when one component must perform both functions. Most of the pre-existing vibration damping means are much more complicated than those just described. It follows that pre-existing bearing structures which are acceptably effective for damping shaft vibrations are also structurally complicated and, therefore, costly and difficult to produce.

SUMMARY OF THE INVENTION

Objectives of the present invention are to provide a bearing assembly, including resilient means for damping shaft vibrations, that is simple in construction and yet is effective to dampen shaft vibrations.

Another objective is to provide a vibration damping device that is suitable for damping vibrations in tilting pad journal bearing designs and non-tilting pad journal bearing designs.

According to the invention, the new bearing utilizes a mostly conventional hollow cylindrical bearing shell. The shaft extends centrally through the shell with the result that there is an annular space defined between the periphery of the shaft and the circular inside wall surface of the shell. Bearing segments or pads, which may be tilting or non-tilting, have their inner bearing surfaces interfaced with the shaft and their opposite outer surfaces presented radially outwardly toward the inside wall surface of the shell but leaving a space between the bearing pads and the shell. A curved spring beam is interposed in this space between each bearing pad and the circular inside surface of the shell. The spring beams are preferably made of hard steel, having a curved radially facing surface against which the radially outwardly presented surface of the bearing pads makes axial line contact. Thus, the bearings, pads or segments can rock or tilt by a small amount relative to the spring beam and the shaft. The radius of curvature of the radially outwardly presented surface of the spring beam is greater than the radius of curvature of the inside circular wall of the shell. Hence, a thin crescent-shaped cavity that tapers circumferentially in opposite directions and is filled with lubricating oil is formed between the outer surface of the spring beam and the inner surface of the shell. The circumferentially spaced apart edges of the spring beams, resulting from the beam radius of curvature being greater than the radius of curvature of the inside surface of the shell, are pressed against the shell to seal off the thin cavity against leakage at its circumferentially spaced apart axially extending edges. The spring beams are substantially coextensive with the bearing pads and the axially opposite ends of the cavities are open. When the shaft deflects or vibrates radially due to load unbalance, the beams deflect or yield and oil in the thin cavity behind the outer surface of the curved spring beams becomes pressurized so some oil is squeezed out or throttled out of the openings to the cavity at the opposite ends. This gradual discharge of captured oil from the cavity results from a vibrational force by the shaft and the pressurized oil in the cavity constitutes a counter-force behind the spring beam that buffers the vibration. As the unbalance force and shaft deflection is relieved successively during a shaft revolution, the shape of the spring beam restores to its original basic unstressed form and in doing so the cavity becomes enlarged again to thereby draw oil into it for suppressing the next forthcoming vibration.

How the foregoing objective and features of the new bearing design are implemented will appear in the ensuing more detailed description of a preferred embodiment of the invention which will now be set forth in reference to the accompanying drawings.

DESCRIPTION OF A PREFERRED EMBODIMENT

Figure 1:
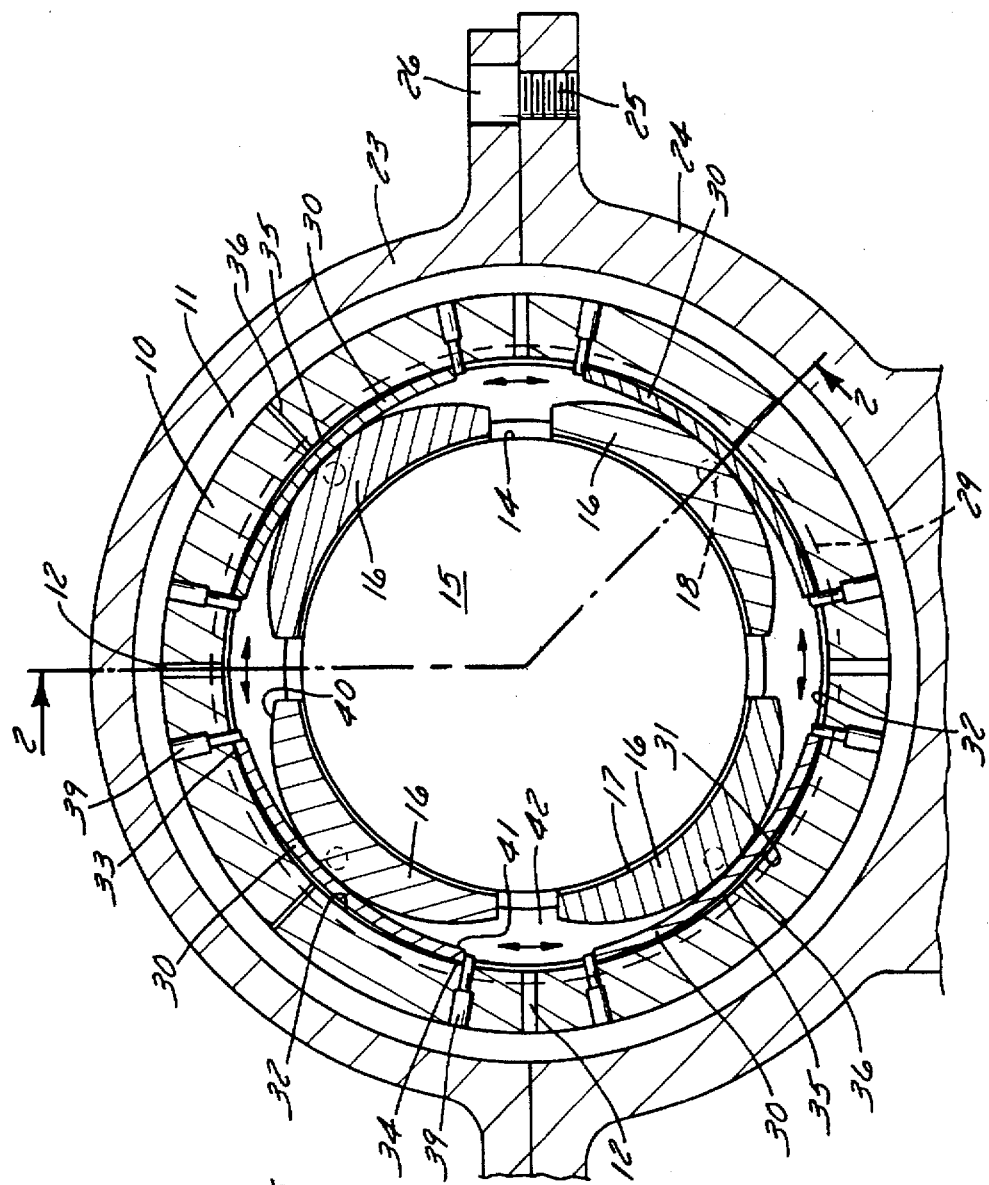
FIG. 1 is a vertical sectional view of a bearing structure in which the bearing pads are in direct contact with a radially inwardly presented curved surface of a curved spring beam whose radially outwardly presented surface has a radius greater than the radius of curvature of the inside wall of the bearing shell so as to define a space or a cavity in which oil is captured and is involved in damping shaft vibrations.
Figure 2:
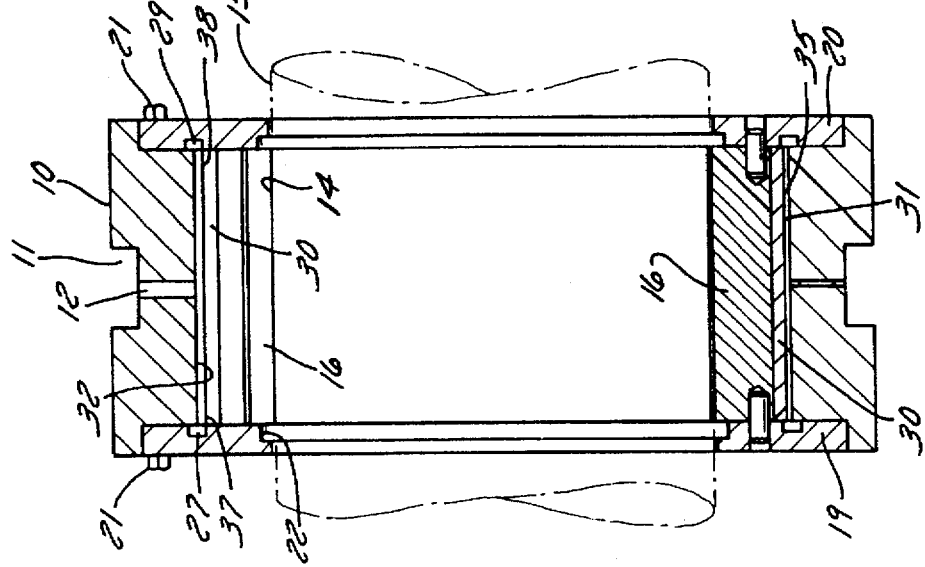
FIG. 2 is a sectional view taken on a line corresponding to the line 2—2 in FIG. 1.

FIG. 1 illustrates a journal bearing structure in which the new spring beam support arrangement for the bearing pads may be used. The bearing structure comprises a cylindrical shell 10 which has a peripheral annular lubricating oil conducting channel 11. The oil in the channel is under pressure but the pump and circulating system for developing the pressure are not shown since they are conventional. The shell is provided with a plurality of radially extending holes 12 for conducting lubricating oil from channel 11 to the periphery 14 of a shaft 15 which is depicted in solid lines in FIG. 1 and in phantom lines in FIG. 2. In the illustrative journal bearing, four bearing pads 16 support shaft 15 for rotation. The inside surface 17 of bearing pads 16 is usually coated with babbitt, which has a low coefficient of friction with respect to shaft 15. Bearing pads 16 are typically made of a steel alloy or a copper based alloy that is stiff and unbending as in the illustrative application. As can be seen particularly well in FIG. 2, bearing pads 16 are secured against being carried circumferentially by the rotating shaft by means pins 18. In this particular design, the parts of the bearing pads 16 are symmetrical relative to pins 18 to allow the inference that the bearing structure performs appropriately for either direction of shaft rotation. End rings 19 and 20 are bolted to the axial ends of bearing shell 10 by means of machine bolts 21. On their inside surfaces, the rings have an annular groove 22 that assures oil will cover the majority of the shaft length residing in bearing pads 16.

FIG. 1 illustrates how the bearing shell 10 mounts in a machine that has an upper clamping member 23 and a lower base member 24. The base member has a threaded hole 25 and the upper member has a hole 26 to provide for bolting the upper member 23 to the lower member 24 to form an oil-tight joint.

In accordance with the invention, vibrations, that is, radial excursions of the shaft 15 are dampened by supporting the bearing pads 16 on spring beams 30. There is one spring beam 30 for each bearing pad 16. The radially outwardly presented surfaces 31 of spring beams 30 have a radius of curvature greater than the radius of curvature of the inner surface 32 of bearing shell 10. A consequence of this is that opposite circumferentially extending edges 33 and 34 of spring beams 30 contact the inner surface 32 of shell 10 due to the load forces transmitted from the shaft through the bearing pads 16 to the spring beams 30. As a result of the radius of curvature of the radially outwardly presented surface 31 of the spring beams 30 being greater than the radius of curvature of the inner surface 32 of the shell 10, a small axially extending crescent-shaped cavity 35 is defined between the outer surface 31 of the spring beam 30 and inner surface 32 of shell 10. As is evident in FIG. 2, the axial length of the spring beams 30 is substantially equal to the axial length of the tilting bearing pads 16. A small diameter hole 36 connects the cavity 35 with the pressurized lubricating oil that is flowing through annular channel 11 in the periphery of the bearing shell 10. The spring beams 30 are held in position within the inner surface 32 of bearing shell 10 symmetrically to the bearing pads 16 by means of pins 39 which extend through the bearing shell as can be seen in FIG. 1.

The arrangement of the bearing pads 16 in conjunction with the spring beams 30 is the epitome of simplicity in respect to spring beam supporting shafts to dampen vibrations of the shaft due to shaft and load unbalance. The spring beams, which are preferably composed of hardened spring steel, are easy to manufacture. The bearing pads 16 are also simple in construction and easy to install contiguous to the spring beams. The radially outwardly presented surface 40 of the bearing pads 16 can be machine cast as a simple segment of a circle having a radius that provides for surface 40 to make tangential contact with the radially inwardly presented surface 41 of spring beams 30.

When shaft 15 and the load thereon is not rotating, everything in the bearing structure is substantially concentric. As the rotational speed of the shaft increases and goes higher and higher, the shaft deflects due to the unbalance loads and traces what may be characterized as an elliptical path for its periphery or, in other words, the shaft wobbles and becomes eccentric relative to the inner surface of bearing shell 10. The eccentric movements of the shaft generates forces that are applied to the inner surfaces 17 of the bearing pads and are transmitted to the central region of the spring beams 30. The crescent shaped cavities 35 are always filled with oil through holes 36 which are fed from the high pressure in the annular channel 11 in the periphery of shell 10. Forces due to unbalance on the shaft cause spring beams 30 to deflect radially outwardly, thereby compressing the oil in cavities 35. This results in oil discharging from the axially separated open ends 37 and 38 of the spring beams 30 into the annular relief grooves 27 and 29 in the end retainer rings 19 and 20. The outflow of oil from the thin cavity 35 is necessarily restricted or throttled and the force that drives the oil out of the end opening of the cavity has a counter-force which dampens the rate of movement of the shaft due to vibration.

Oil is supplied to the crescent shaped cavities 35 through the small holes 36 in the shell 10 from the pressurized channel 11. There will be some flow back through the small holes 36 when the cavity size is decreasing because of the vibratory load on the associated pad, but the majority of the discharge from a cavity 35 will be axially outward from the axially open ends 37 and 38 of the cavity. When the beam returns to its unflexed state as the vibrational deflection of the shaft moves on rotationally, oil will be drawn into the cavity both through the small hole 36 and also axially through end openings 37 and 38 of the cavity from the annular grooves 27 and 29 in the end plates 19 and 20. There is a net flow of oil through the holes 36 into the bearing, however, since the pressure in annular channel 11 is greater than the pressure in the cavities 42 between the end plates 19 and 20 that retain the pads against axial movement.

Although an embodiment of the new spring beam arrangement has been described in detail, such description is intended to be illustrative rather than limiting, for the invention may be variously embodied and is to be limited only by interpretation of the claims which follow:

I claim:

1. An oil lubricated journal bearing adapted for damping vibrations of a shaft in the bearing, the bearing comprising:

a fixedly supported member having an axially extending opening defined by an inside circular surface having a predetermined radius of curvature for a shaft to extend through said opening and allow an annular space between the periphery of the shaft and said circular surface, the member having a peripheral channel for conducting pressurized oil, a plurality of spring beams secured in circumferentially spaced apart positions adjacent said circular surface, each spring beam having opposite circumferentially spaced apart axially extending edges and having an inside surface facing radially inwardly of said opening, an outside surface facing radially outwardly of said opening for said edges to make contact with said circular surface and having a radius of curvature greater than said radius of curvature of the circular surface such that when said edges at the outside surface of said spring beam are in contact with said circular surface, a cavity for containing oil is defined between said circular surface and said outside surface of the spring beam, a bearing pad interposed between the inside surface of each spring beam and said shaft, a small radially directed oil conduction hole through said fixedly supported member at each of the cavities to provide for supplying oil to said cavities from said pressurized oil conducting channel.

2. A journal bearing according to claim 1 wherein each bearing pad, has a radially inwardly facing curved surface bearing on said shaft and an opposite radially outwardly facing curved surface in tangential contact with said inside surface of a spring beam to allow each said bearing pad to tilt relative to said shaft in response to shaft rotation, said opening in said fixedly supported member having axially opposite ends and a ring member surrounding said shaft and fastened to each of the adjacent said opposite ends, respectively, and at least one pin for each bearing pad fixed in a ring member and extending into the bearing pad.

3. A journal bearing according to claim 1 wherein said fixedly supported member has an outside circular surface concentric with said inside circular surface, the outside circular surface having an annular lubricating oil conducting channel, and said holes through said fixedly supported member conduct oil from said channel to said cavities.

* * * * *